United States Patent
Shekunov et al.

(10) Patent No.: US 7,449,136 B2
(45) Date of Patent: Nov. 11, 2008

(54) METHOD AND APPARATUS FOR PRODUCING COMPOSITE PARTICLES USING SUPERCRITICAL FLUID AS PLASTICIZING AND EXTRACTING AGENT

(75) Inventors: Boris Y. Shekunov, Aurora, OH (US); Pratibhash Chattopadhyay, North Royalton, OH (US); Jeffrey S. Seitzinger, Broadview Heights, OH (US)

(73) Assignee: Ferro Pfanstiehl Laboratories, Inc., Waukegan, IL (US)

( * ) Notice: Subject to any disclaimer, the term of this patent is extended or adjusted under 35 U.S.C. 154(b) by 568 days.

(21) Appl. No.: 10/531,008

(22) PCT Filed: Feb. 18, 2004

(86) PCT No.: PCT/US2004/004756

§ 371 (c)(1),
(2), (4) Date: Apr. 12, 2005

(87) PCT Pub. No.: WO2005/005010

PCT Pub. Date: Jan. 20, 2005

(65) Prior Publication Data

US 2006/0076293 A1  Apr. 13, 2006

Related U.S. Application Data

(60) Provisional application No. 60/449,479, filed on Feb. 21, 2003.

(51) Int. Cl.
*B29B 9/00* (2006.01)
*A61K 9/14* (2006.01)

(52) U.S. Cl. ............... 264/5; 239/10; 264/12; 424/486; 424/489

(58) Field of Classification Search ............ 210/634, 210/639; 264/4.1, 5–12; 424/400, 450, 486, 424/489–502; 428/402, 402.2, 402.21, 402.22, 428/403; 239/8–10
See application file for complete search history.

(56) References Cited

U.S. PATENT DOCUMENTS

| 5,548,004 | A |   | 8/1996 | Mandel et al. |
| 5,639,441 | A | * | 6/1997 | Sievers et al. ............... 424/9.3 |
| 5,766,637 | A | * | 6/1998 | Shine et al. ................ 424/497 |
| 6,248,363 | B1 |   | 6/2001 | Patel et al. |
| 6,414,050 | B1 |   | 7/2002 | Howdle et al. |

(Continued)

*Primary Examiner*—Joseph W Drodge
(74) *Attorney, Agent, or Firm*—Rankin, Hill & Clark LLP (57) ABSTRACT

The present invention provides methods for producing composite particles using supercritical fluid as a plasticizing and extracting agent, composite particles formed in accordance with the methods and an apparatus for carrying out the methods. In accordance with the methods of the invention, a polymer, a wax and/or a lipid that is a solid at standard temperature and pressure is contacted with a supercritical fluid to form a melt, either before or after the polymer, wax and/or lipid has been contacted with a solution comprising a solute dissolved in a solvent. The supercritical fluid plasticizes the polymer, wax and/or lip and extracts the solvent from the solution, resulting in the formation of a two-fraction system including a first melt-rich fraction that includes the plasticized melt and fine particles of precipitated solute that are dispersed in the melt, and a second fraction that includes the supercritical fluid and the solvent. Expansion of the first fraction across a pressure drop results in the formation of composite particles that include the polymer, wax and/or lipid and the solute.

18 Claims, 4 Drawing Sheets

U.S. PATENT DOCUMENTS

| | | |
|---|---|---|
| 6,488,952 B1 | 12/2002 | Kennedy et al. |
| 6,599,627 B2 * | 7/2003 | Yeo et al. ............... 428/402.21 |
| 6,630,121 B1 * | 10/2003 | Sievers et al. .............. 424/1.13 |
| 6,767,637 B2 * | 7/2004 | Park et al. ............... 428/402.21 |
| 6,986,846 B2 * | 1/2006 | Shekunov et al. ........... 210/634 |

* cited by examiner

FIG. 5

METHOD AND APPARATUS FOR PRODUCING COMPOSITE PARTICLES USING SUPERCRITICAL FLUID AS PLASTICIZING AND EXTRACTING AGENT

BACKGROUND OF THE INVENTION

1. Field of Invention

The present invention relates generally to methods for producing composite particles and, more particularly, to methods for producing composite particles using supercritical fluid as a plasticizing agent and an extracting agent.

2. Description of Related Art

Several processing techniques utilize the enhanced mass-transfer properties and benign nature of supercritical or near-critical fluids and/or compressed gases (hereinafter collectively referred to as "supercritical fluid") for manufacturing composite or single-material particles. Three such processing techniques are sometimes referred to in the art as: Rapid Expansion of Supercritical Solution (RESS); Particles from Gas-Saturated Solutions (PGSS); and Supercritical Anti-Solvent (SAS).

RESS involves the precipitation of particulate material by dissolving the material in supercritical fluid to form a solution, and expanding the solution across a pressure drop. RESS usage is thus limited to compounds with a significant solubility in the supercritical fluid (typically higher than $10^{-4}$ mole fraction). Most common carrier materials that are used or desirable for coating biologically active materials are practically insoluble in supercritical fluid. Hence, the RESS technique is generally not well suited for forming uniformly coated composite particles for such applications.

The conventional SAS technique involves the dissolving of a solute in a solvent to form a solution, and then precipitation of the solute from the solution where supercritical fluid is used to extract the solvent from the solution. The SAS technique can produce generally uniform particles of various pharmaceutical materials. But, a disadvantage to this SAS technique is that sometimes it is difficult to prepare some composite particles. For example, the particles in some SAS processes precipitate as intimate mixtures rather than encapsulates. Further, some polymers precipitated by supercritical fluid extraction (SAS) agglomerate to form undesirably large particles or particles having an undesirably broad particle size distribution. Further, the solute loading of carrier material is sometimes limited by process constraints. That is, higher loading efficiencies can be difficult to achieve using this process.

With reference to the conventional PGSS technique, there can be an undesirable level of difficultly in particle production. For example, it is known that an increased viscosity and an uneven size distribution of a core material can lead to non-uniform blends of a carrier material and the core material. Thus, high viscosities and uneven size distributions can result in an inefficient coating of the core material by the carrier material, and particles thus formed have a broad size distribution. Other effects such as demixing and poor wetting can add to the difficulty of particle production using this method. Demixing and poor wetting can reduce the coating efficiency between, for example, the carrier material and the core material, which can cause an undesirable inhomogeneous particle coating.

BRIEF SUMMARY OF THE INVENTION

The present invention provides methods for producing composite particles using supercritical fluid as a plasticizing agent and as an extracting agent, composite particles formed in accordance with the methods, and an apparatus for carrying out the methods. In accordance with the first and second embodiments of the invention, a polymer, a wax and/or a lipid that is a solid at standard temperature and pressure is contacted with a supercritical fluid to form a plasticized melt. The melt is then contacted with a solution comprising a solute dissolved in a solvent. The supercritical fluid, in addition to plasticizing the polymer, wax and/or lipid, extracts the solvent from the solution causing the solute to precipitate in the form of fine particles that become dispersed in the melt. Two fractions are thus formed: (1) a melt-rich fraction that comprises fine particles of the solute dispersed in the supercritical fluid plasticized polymer, wax and/or lipid; and (2) a supercritical fluid-rich fraction that comprises the supercritical fluid and the extracted solvent. The melt-rich fraction is expanded across a pressure drop, which causes the supercritical fluid to flash into a gas thereby resulting in the formation of composite particles comprising the polymer, wax and/or lipid and the solute. In the first embodiment of the invention, the solvent is removed from the system via evaporation after expansion of the melt-rich fraction. In the second embodiment of the invention, the solvent is removed from the system prior to expansion of the melt-rich fraction.

In the third and fourth embodiments of the invention, the polymer, wax and/or lipid and the solution comprising the solute dissolved in the solvent are mixed together to form a load stock. The polymer, wax and/or lipid can either be dissolved in the solution or can be present in the solution in the form of a suspension. The load stock is then contacted with a supercritical fluid, which causes the polymer, wax and/or lipid to form a plasticized melt. The supercritical fluid can be introduced into the load stock or, alternatively, the load stock can be introduced into the supercritical fluid. In either case, the supercritical fluid extracts the solvent from the solution causing the solute and the polymer, wax and/or lipid to precipitate in the form of fine particles. The supercritical fluid subsequently plasticizes the polymer, wax and/or lipid forming a melt having the solute particles dispersed in it. Two fractions are thus formed: (1) a melt-rich fraction that comprises fine particles of the solute dispersed in the supercritical fluid plasticized polymer, wax and/or lipid; and (2) a supercritical fluid-rich fraction that comprises the supercritical fluid and the extracted solvent. The melt-rich fraction is expanded across a pressure drop, which causes the supercritical fluid to flash into a gas thereby resulting in the formation of composite particles comprising the polymer, wax and/or lipid and the solute. In the third embodiment of the invention, the solvent is removed from the system via evaporation after expansion of the melt-rich fraction. In the fourth embodiment of the invention, the solvent is removed from the system prior to expansion of the melt-rich fraction.

In all methods of the present invention, the supercritical fluid acts as a plasticizing agent that transforms the polymer, wax and/or lipid into a melt. In addition, the supercritical fluid also acts as an extracting agent that strips, extracts or separates the solvent from the solute, which precipitates into the melt in the form of solid particles. Expansion of the melt having the solute dispersed therein across a pressure drop results in the formation of composite particles comprising the polymer, wax and/or lipid and the solute. The present invention overcomes some of the limitations of prior art supercritical fluid processing techniques and thereby provides much needed control over the size, distribution and morphology of the resulting composite particles.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Figure 1:
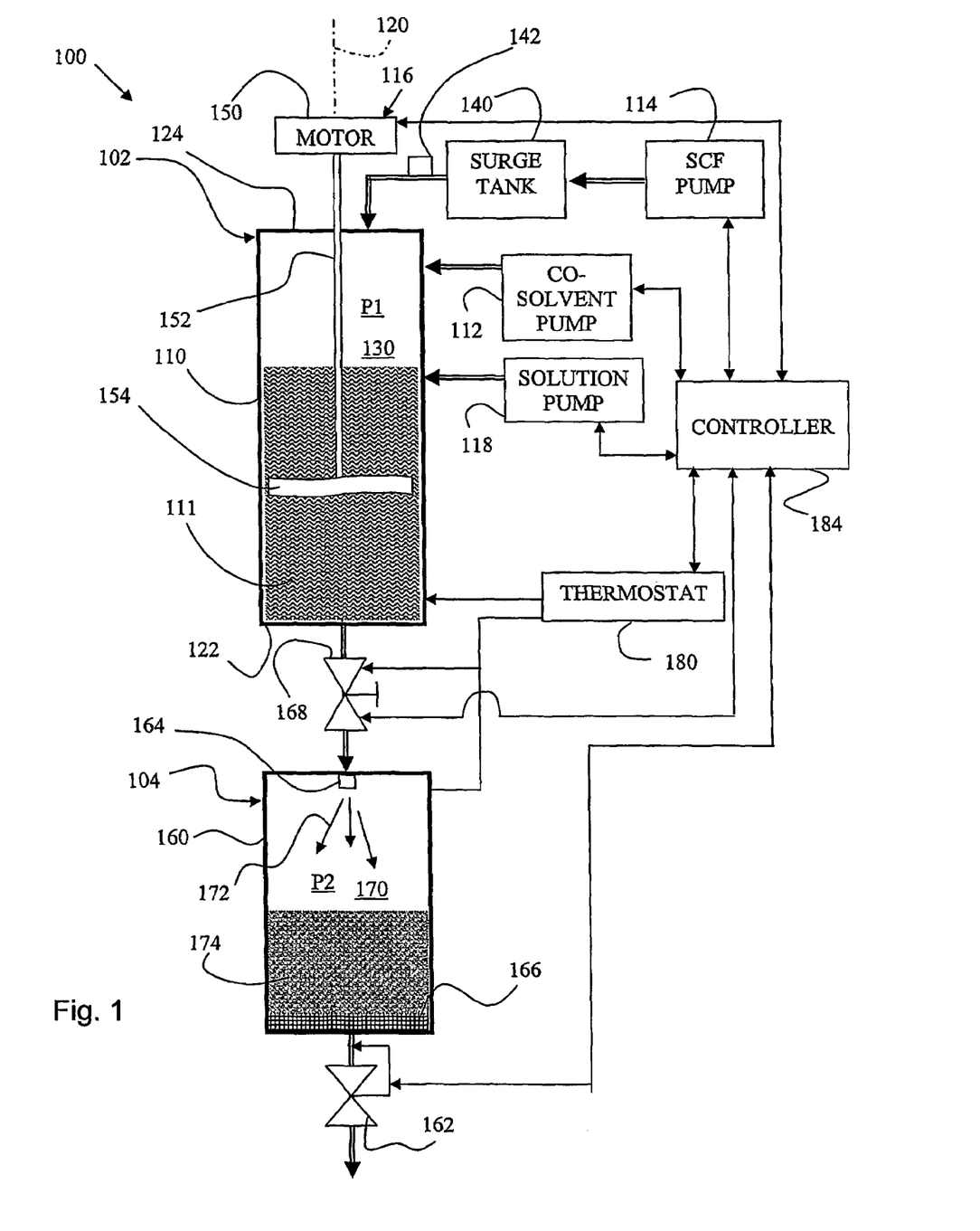
FIG. 1 is a schematic drawing of an apparatus for implementing the methods of the present invention.

With reference to FIG. 1, an apparatus 100 for implementing methods according to the invention generally comprises a mixing assembly 102 and an expansion assembly 104. Each of these assemblies is separately discussed below.

The mixing assembly 102 includes a mixing vessel 110, a solvent pump 112, a supercritical fluid pump 114, a mixer assembly 116, and a solution pump 118. In schematic drawing FIG. 1, the mixing vessel 110 is shown as a tubular vessel having a central axis 120 and first and second ends 122, 124. The vessel is preferably oriented such that the first end 122 is below the second end 124. In other words, the second end 124 is preferably UP and the first end 122 is preferably DOWN when moving along the axis 120. The mixing vessel 110 has an inner surface that defines a mixing chamber 130. The pressure in the mixing chamber 130 is denoted with the reference number P1.

The mixer assembly 116 includes a motor 150, a shaft 152 extending from the motor 150 through the second end 124 of the mixing vessel 110 and into the chamber 130, and a rotor 154 disposed at a distal end of the shaft 152 and located in the chamber 130. The mixing rate is controlled by the rotation speed and geometry (type and diameter) of the rotor 154. In schematic drawing FIG. 1, the rotor 154 is shown as a propeller-shaped two-bladed mixer. It will be appreciated that an additional and/or alternative mixing means can be used (e.g., static mixing devices, baffles, rotors, turbines, shear-mixers, ultrasonic devices, and other devices or mechanisms conventionally used to mix materials together).

The mixing assembly 102 preferably includes means (not shown) for accessing the interior of the mixing vessel 110 so as to charge the interior with a polymer, wax and/or lipid that is a solid at standard temperature and pressure. Throughout the instant specification and in the appended claims, the phrase "standard temperature and pressure" means 25° C. and 1 atmosphere pressure. The polymer, wax and/or lipid serves as coating, encapsulating and/or carrier materials in the composite particles formed according to the methods. Suitable polymers for use in the invention include, for example, polysaccharides, polyesters, polyethers, polyanhydrides, polyglycolides (PLGA), polylactic acid (PLA), polycaprolactone (PCL), polyethylene glycol (PEG) and polypeptides. Suitable lipids include, for example, glycerides.

The solution pump 118 is preferably high-pressure liquid chromatography (HPLC) reciprocating pumps, such as the model PU-2080, which is commercially available from Jasco Inc. (Easton, Md.). Suitable alternative pumps include syringe type pumps, such as the 1000D or 260D pumps, which are commercially available from Isco Inc. (Lincoln, Nebr.). The solution pump is in fluid communication with the mixing chamber 130 via liquid inlet nozzles that extend though a wall of the mixing vessel 110. The solution pump 118 supplies the solution to the chamber 130. The solvent can be any solvent suitable for use with the other system parameters, such as the supercritical fluid and the solute. Optionally, a co-solvent can be introduced into the vessel using another co-solvent pump 112 (e.g., an HPLC pump) in order to affect the viscous properties of the melt. The optional co-solvent can be the same as or different than the solvent in the solution.

Preferred solvents for use in the invention include, for example, alcohols, toluene, ethyl acetate, methyl chloride, methylene chloride, dimethyl sulfoxide (DMSO) and dimethyl formamide (DMF). It will be appreciated that depending upon the composition of the desired composite particles, other organic or inorganic solvents could be used. The solvent must be selected with reference to the solvents solubility in the supercritical fluid, with higher solubility being generally more desirable. Additional factors influencing the choice of solvent include the ability or inability of the solvent to dissolve the solute, the solvent's tendency to react with or adversely affect the solute, the toxicity or biocompatibility of the solvent (with reference to residual solvent traces), and the ease of recovery of the solvent for purposes of recycling or reuse.

As described above, the solution supplied by the solution pump 118 includes one or more solutes dissolved, emulsified or suspended in a suitable solvent. The solute is preferably a biologically active substance such as, for example, a drug, a pharmaceutical, a therapeutic agent, a medicinal agent, viral material, a diagnostic aid, a nutritional material, a protein, a peptide, an antigen, an enzyme, a catalyst, a nucleic acid or a combination of the foregoing.

The concentration of the solute in the solution is preferably greater than 1 weight percent (% w/w), and more preferably greater than 5% w/w, and most preferably greater than 10 (% w/w). The solute preferably forms a core material of the final composite particles.

Surfactants, agents, buffers or modifiers can be added to the solvent or to the supercritical fluid, as desired. For example, an excipient can be dissolved in alcohol and then pumped into the chamber 130 to be dispersed into the plasticized carrier material or melt. Particles made from such a melt would have a quantity of the excipient contained therein.

The supercritical fluid pump 114 is preferably a P-200 high-pressure reciprocating pump commercially available from Thar Technologies, Inc. (Pittsburgh, Pa.). Suitable alternative pumps include diaphragm pumps and air-actuated pumps that provide a continuous flow of supercritical fluid. The supercritical fluid pump 114 supplies the supercritical fluid through a surge tank 140 and a metering valve 142 so as produce a pulse-free flow. Because the supercritical fluid pump 114 is in fluid communication with the mixing chamber 130, the supercritical fluid pump 114 can supply supercritical fluid through the surge tank 140 and into the chamber 130.

With reference to the supercritical fluid that the supercritical fluid pump 114 supplies to the chamber 130, the supercritical fluid is preferably supercritical carbon dioxide ("$CO_2$"). Suitable alternative supercritical fluids include water, nitrous oxide, dimethylether, straight chain or branched C1-C6-alkanes, alkenes, alcohols, and combinations thereof. Preferable alkanes and alcohols include ethane, ethanol, propane, propanol, butane, butanol, isopropane, isopropanol, and the like. The supercritical fluid is chosen generally with reference to the ability of the supercritical fluid to plasticize the polymer, wax and/or lipid to form a melt, and further with reference to parameters similar to the choice of solvents. Throughout the instant specification and in the appended claims, the term "melt" denotes that the supercritical fluid reduces the viscosity of the polymer, wax and/or lipid (e.g., via plasticization, swelling or dissolution) so as to render it a fluid or semi-fluid that can be processed as such. In other words, the polymer, wax and/or lipid can be flowed, pumped or sprayed as a fluid or semi-fluid.

With reference to the expansion assembly 104, the expansion assembly 104 preferably comprises a receiving or expansion vessel 160, a backpressure regulator 162, a nozzle 164, and a filter 166. The expansion vessel 160 is in fluid communication with the mixing vessel 110 via a release valve 168, which is disposed between the mixing vessel 110 and the expansion vessel 160, and is in fluid communication with the nozzle 164. The filter 166 is adjacent an outlet from the expansion vessel 160 to the backpressure regulator 162.

The expansion vessel 160 has an inner surface that defines an expansion chamber 170. The pressure inside the expansion chamber is denoted with reference number P2. The expansion vessel 160 preferably includes means (not shown) to access the expansion chamber 170 to permit the removal of the composite particles after the expansion operation.

The backpressure regulator 162 is preferably a 26-1700 type regulator, which is commercially available from Tescom, USA (Elk River, Minn.). The backpressure regulator 162 maintains the pressure P2 in the expansion chamber 170 in a predetermined range of pressures. The release valve 168 is a standard commercially available valve and is interchangeable with other like valves that are known to those of ordinary skill in the art. The release valve 168 controls the rate of flow of material from the mixing chamber 130 through the nozzle 164 and into the expansion chamber 170. Accordingly, the release valve 168 and the backpressure regulator 162 cooperate to maintain the desired pressure P2 in the expansion chamber 170 during operation.

A thermostat 180 communicates with heating elements (not shown) that are located proximate to the mixing vessel 110, the expansion vessel 160, and the release valve 168. A controller 184 communicates with and controls the solution pump 118, optional co-solvent pump 112, the supercritical fluid pump 114, the thermostat 180, the mixer assembly 116, the backpressure regulator 162, and the relief valve 168. Suitable controllers are well known in the art and are interchangeable therewith.

A first embodiment of a method according to the invention is described with reference to FIGS. 1 and 2. First, the mixing vessel 110 is charged with a quantity of a suitable polymer, wax and/or lipid, which is referred to in FIG. 2 as a "carrier material" (step 200). The mixing vessel 110 is closed and sealed. The controller 184 activates the supercritical fluid pump 114 to supply a quantity of supercritical fluid through the surge tank 140, through the metering valve 142, and into the mixing vessel 110 (step 202). The addition of the supercritical fluid by the supercritical fluid pump 114 increases the pressure P1 in the mixing vessel 110 to a predetermined pressure. The thermostat 180 and the supercritical fluid pump 114 cooperate to maintain the temperature and the pressure P1, respectively, in a generally constant desired operating range. Accordingly, the pressure P1 is generally in a range that is increased relative to atmospheric pressure, and is maintained in a predetermined range so the supercritical fluid remains in a supercritical state. The carrier material (i.e., the polymer, wax and/or lipid) can contact the supercritical fluid in the mixing vessel 110 in the absence of any solvents or, optionally, the controller 184 controls the co-solvent pump 112 to supply one or more co-solvents into the mixing vessel 110.

The controller 180 controls the mixer assembly 116. If a rotary mixing device is being used, the controller 180 can instruct the motor 150 to rotate the shaft 152 and the rotor 154. The rotor 154 spins to mix the supercritical fluid and the carrier material until a uniform plasticized mixture is achieved, which is hereinafter referred to as a melt 111 (step 204). That is, the supercritical fluid interacts with and affects the visco-elastic properties of the carrier material to form a molten or liquefied mass or melt 111. The melt 111 can thus behave as a fluid or semi-fluid, and be processed as such.

The controller 184 controls the solution pump 118 to supply a predetermined quantity of the solution into the mixing vessel 110. The solution comprises one or more solutes that are dissolved, dispersed or suspended in a solvent, as previously discussed above. As the solution is introduced into the mixing vessel, the supercritical fluid present in the vessel extracts the solvent from the solution, which causes the solute to precipitate from the solution. The mixing assembly 116 then mixes the precipitated particles and the melt 111 together (step 206). During this mixing operation, a two-component or two-fraction system is formed. The first fraction, which is hereinafter sometimes referred to as the "melt-rich fraction", comprises the melt (i.e., the supercritical fluid plasticized polymer, wax and/or lipid), some supercritical fluid, and solid particles of the solute. The second fraction, which is hereinafter sometimes referred to as the "supercritical fluid-rich fraction", comprises the remainder of the supercritical fluid and the extracted solvent. Thus, the supercritical fluid serves both as a plasticizing agent for the polymer, wax and/or lipid and as an extracting agent for the solvent. Due to differences in solubility (i.e., the solvent is more soluble in the supercritical fluid than the solute), the solute tends to precipitate from the solvent in the form of solid particles that become dispersed within the melt. The solid particles of solute dispersed within the melt tend to be very crystalline, substantially uniform in size and substantially solvent-free.

In the first embodiment of a method according to the invention, the contents of the mixing vessel 110 are expanded across a pressure drop through the nozzle 164 and into the expansion chamber 170. The supercritical fluid 172 flashes into a gas leaving composite particles 174 comprising the polymer, wax and/or lipid and the solute. The solvent present during expansion is removed from the expansion chamber by the process of evaporation. The temperature of the expansion chamber is maintained above the boiling point of the solvent and monitored in order to facilitate the removal of the solvent from the expansion chamber. The pressure P2 in the expansion chamber 170 is preferably at or near atmospheric pressure. Optionally, the controller 184 can control the pressure P2 to be increased relative to atmospheric pressure by using the backpressure regulator 162. By manipulating the pressure differential, the size and configuration of the nozzle 164, and the rate at which the first fraction is allowed to flow from the mixing vessel 110 to the expansion chamber 170, the size and morphology of the resultant particles can be controlled. Generally, the larger the pressure differential, the smaller the resultant particles that are produced. Accordingly, the pressure P2 can be maintained at a pressure that is lower than atmospheric pressure in order to increasing the pressure differential.

Particle characteristics are also influenced by the rate of extraction of the solvent or co-solvents from the melt by the supercritical fluid, and by interactions between the polymer, wax and/or lipid and the solute. Additives, such as the surfactants and additives described hereinabove, can also be added to affect the particle precipitation rate, and to further influence the number and solid-state properties (e.g., crystallinity and polymorphism) of the composite particles 174.

When the first fraction passes across the pressure drop, the supercritical fluid that plasticizes the polymer, wax and/or lipid decompresses and returns to a gaseous state. This increases the melting point and/or glass transition temperature of the melt 111. As a result, the polymer, wax and/or lipid returns to a solid form, thereby encapsulating, coating or otherwise mixing to form composite particles 174 that also include the solute. Fine composite particles can be formed, whereby the polymer, wax and/or lipid encapsulate a core of solute. Alternatively, microspheres or homogeneous dispersions of solute in a polymer, wax and/or lipid can also be obtained. The composite particles obtained in accordance with the invention preferably have an average diameter of from about 0.5 micrometers (μm) to about 15 micrometers (μm).

The phase change of the supercritical fluid from liquid to gas (compressed to uncompressed) also reduces the localized temperature of materials adjacent to the expansion location (i.e., the nozzle outlet) via an adiabatic expansion. If a nozzle heater is present, the nozzle temperature can be controlled to affect particle characteristics, such as size and morphology.

The composite particles 174 collect in the expansion chamber 170. As noted, the composite particles can be in the form of microspheres, microcapsules, coated particles, or the like. Alternatively, the expanded material can be in the form of a suspension, foam, a web, or a gel rather than discrete particles. Further, the particles can have different surface profiles or morphologies, for example sphere, rod, or other basic geometric shape and can be discrete or can be grouped or agglomerated.

Figure 2:
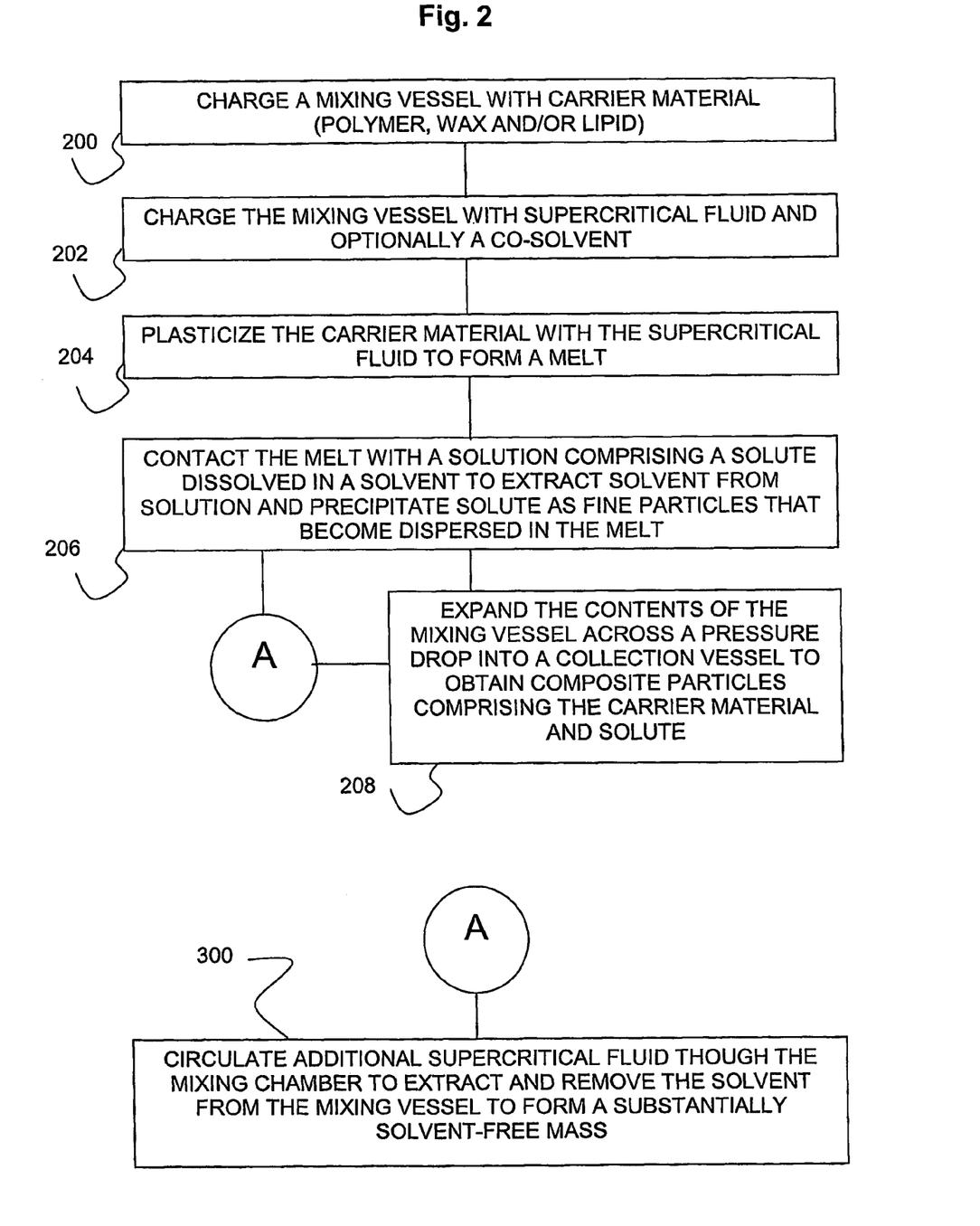
FIG. 2 is a block diagram of the steps of a method of the present invention.

In the second embodiment of a method of the invention, additional amounts of supercritical fluid are recirculated through the two-fraction system for the purpose of stripping out the solvent (See the "A" step, shown in FIG. 2, (Step 300). Ideally, as additional supercritical fluid is introduced into the mixing vessel, a portion of the second fraction containing the supercritical fluid and the solvent is removed, and the solvent is separated from the supercritical fluid, which is then recycled and pumped back into the two-phase system. Once substantially all of the solvent has been removed from the two-fraction system to form a solvent-free two-phase system, both the first phase and the second phase are expanded across the pressure drop. The supercritical fluid decompresses and flashes into a gas resulting in the formation of composite particles. Moreover, because substantially all of the solvent has been removed from the system, there is little danger or risk that the composite particles will become dissolved in the collection vessel.

In the third and fourth embodiments of the invention, the polymer, wax and/or lipid and the solution are contacted together to form a load stock, which is then contacted with a supercritical fluid. The load stock can be charged to the mixing vessel first, and then supercritical fluid can be pumped into the mixing vessel containing the load stock. Or, alternatively, the supercritical fluid can be charged to the mixing vessel first, and the load stock can be pumped into the mixing vessel containing the supercritical fluid. In either case, the supercritical fluid plasticizes the polymer, wax and/or lipid to form a melt and also extracts the solvent from the solution, which causes the solute to precipitate in the form of fine particles that become dispersed in the melt. Thus, a melt-rich fraction comprising the plasticized polymer, wax and/or lipid, some supercritical fluid and the solute, and a supercritical fluid-rich fraction comprising the remainder of the supercritical fluid and the extracted solvent, is formed. In the third embodiment of the invention, the entire contents of the mixing vessel are pumped across a pressure drop, causing the supercritical fluid to flash into a gas. The solvent is removed via evaporation. In the fourth embodiment of the invention, the extracted solvent is removed from the mixing vessel via the recirculation of supercritical fluid before the contents of the mixing vessel are pumped across the pressure drop.

The following examples are intended only to illustrate the invention and should not be construed as imposing limitations upon the claims. Unless specified otherwise, all ingredients are commercially available from such common chemical suppliers as Sigma Aldrich, Inc. (St. Louis, Mo.) and/or Fisher Scientific International, Inc. (Hanover Park, Ill.).

EXAMPLE 1

Preparation.

6 grams (g) of polyethylene glycol (PEG), 2 g of acetaminophen (paracetamol), and 20 milliliters (ml) of ethanol (EtOH) were charged to a mixing vessel having a volume of 100 ml. The vessel was pressurized with carbon dioxide gas ($CO_2$) to an operating pressure of 30 megaPascal (MPa) and heated to a temperature of 323 Kelvin (K)

At the predetermined temperature and pressure, the carbon dioxide became supercritical. The controller was set to maintain the mixer to rotate the mixer blade at a constant agitation speed of 4000 revolutions per minute (rpm). The ingredients were mixed for 30 minutes with a continuous flow of supercritical carbon dioxide passing through the mixing vessel to remove ethanol from the system.

Expansion of Particles.

A release valve was opened to communicate the entire contents of the mixing vessel to an expansion vessel. Specifically, the open release valve allowed the mixture to flow to a nozzle that opened into the interior of the expansion vessel. The nozzle had an orifice with a diameter of 1.9 millimeter (mm). The pressure in the interior of the expansion vessel was standard atmospheric pressure, and the pressure in the mixing vessel was adjusted to remain at a constant 30 megapascals (MPa).

As the mixture flowed through the orifice, the supercritical fluid flashed into a gas at atmospheric pressure. The mixture formed into particles. The particles were collected in the expansion chamber after completion of the process.

Analysis of the Particles.

Figure 3:
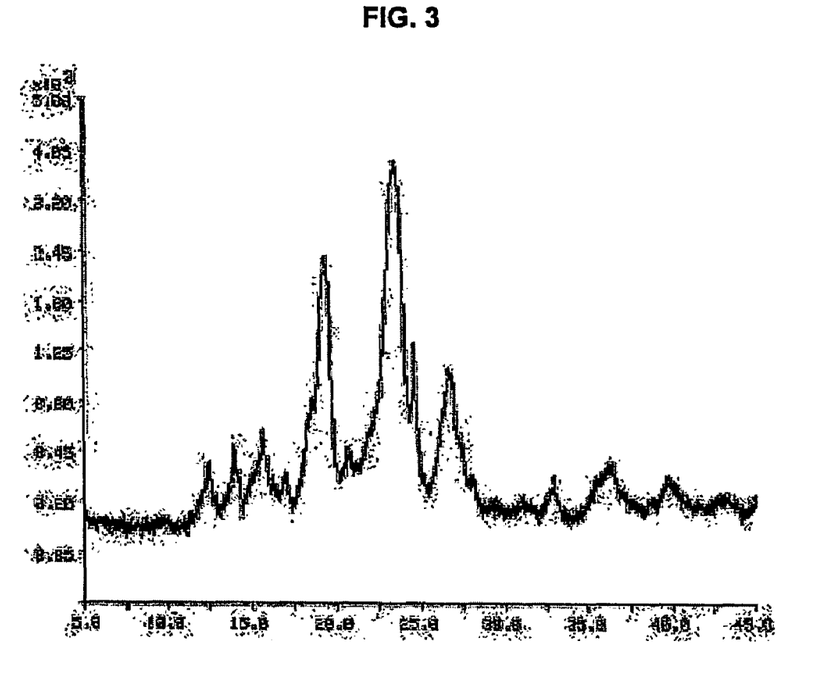
FIG. 3 is an X-Ray analysis of particles produced in Example 1.

Analysis of the particles was performed using a Scanning Electron Microscope (SEM) to determine size and morphology and using an X-ray powder diffraction spectrometer (XPD) to determine solid phase/crystallinity. The particles produced in EXAMPLE 1 had a size in a range of from 20 micrometers or microns (μm) to 100 μm as shown by the SEM micrograph. The particles formed a porous network. The chemical composition of the final product was determined to be 25% w/w acetaminophen and the balance PEG. The x-ray analysis determined that about 50% of the acetaminophen was crystalline and about 50% of the acetaminophen was in the form of solid molecular dispersion of acetaminophen in PEG (see FIG. 3).

EXAMPLE 2

Preparation.

10 grams of tripalmitin (DYNOSAN 114) were charged into the mixing vessel. The mixing vessel defined a chamber having a volume of 100 ml. The chamber was pressurized with carbon dioxide gas ($CO_2$) to an operating pressure of 30 megaPascal (MPa), and heated to a temperature of 328 Kelvin (K). At the predetermined temperature and pressure, the carbon dioxide became supercritical. The tripalmitin formed a melt. An optical cell was used to observe the phase change. The tripalmitin melting point was depressed from about 340 K to about 328 K. The controller was set to maintain the mixer to rotate the mixer blade at a constant agitation speed of 4000 revolutions per minute (rpm). The melt mixed for 30 minutes.

A solution of 1 g of ketoprofen dissolved in 6 ml of acetone was prepared. The solution pump was activated, and the ketoprofen solution was injected into the mixing chamber while the mixer was mixing. After the solution was injected, the mixer continued mixing for 20 minutes.

Additional supercritical carbon dioxide from the supercritical fluid pump was circulated through the mixing chamber, and then removed through a backpressure regulator communicating with the mixing chamber. The carbon dioxide dissolved the acetone and carried the acetone out of the mixing chamber. The carbon dioxide was circulated for 30 minutes at a flow rate of 20 ml/min.

Expansion of Particles.

A release valve was opened to communicate the contents of the mixing vessel to an expansion vessel. Specifically, the release valve communicated the emulsion to a nozzle that opened into the interior of the expansion vessel. The nozzle was a multiple nozzle plate defining ten orifices; each orifice had a diameter of 150 micrometers ($\mu m$).

The pressure in the interior of the expansion vessel was standard atmospheric pressure, and the pressure in the mixing vessel was adjusted to remain at a constant 30 megapascals (MPa). The supercritical fluid flashed into a gas at atmospheric pressure. The tripalmitin/ketoprofen melt was expanded by the supercritical fluid reacting to the pressure differential and formed particles. The particles were collected in the expansion chamber in the form of dry particles.

Analysis of the Particles.

Analysis of the particles formed in EXAMPLE 2 was performed using a Scanning Electron Microscope (SEM) to determine morphology and using a laser diffraction particle analyzer to determine particle size distribution.

Figure 4:
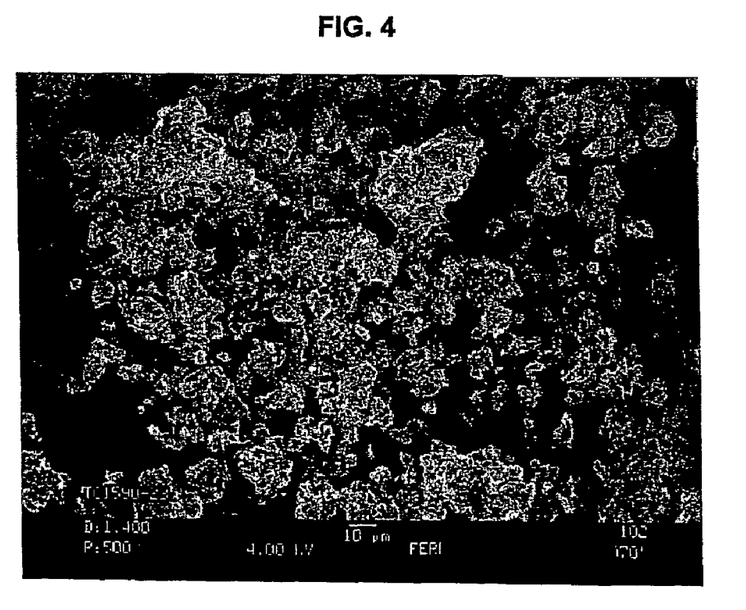
FIG. 4 is a scanning electron micrograph of particles produced in Example 2.
Figure 5:
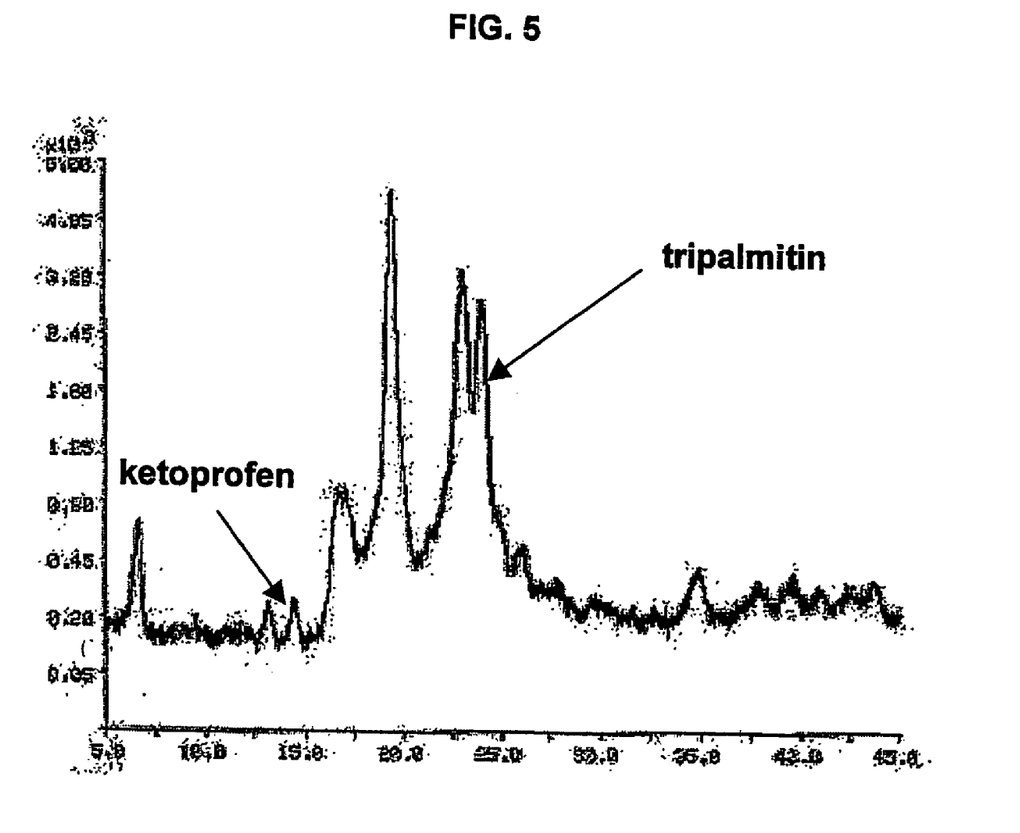
FIG. 5 is an X-ray analysis of particles produced in Example 2.

The particles consisted of porous particle aggregates having a size in a range of from about 0.5 $\mu m$ to about 15 $\mu m$ (see FIG. 4). The aggregates formed a porous network with a volume mean diameter (measured in an aqueous suspension) of about 11 $\mu m$. The chemical composition was about 10% w/w of ketoprofen, balance tripalmitin. The X-ray phase analysis showed that ketoprofen was present in the form of sub-micron sized crystals embedded into or coated by the tripalmitin (see FIG. 5).

EXAMPLE 3

Preparation.

5 grams of tripalmitin (DYNOSAN 114) was charged into the mixing vessel. The mixing vessel defined a chamber having a volume of 100 ml. The chamber was pressurized with carbon dioxide gas ($CO_2$) to an operating pressure of 30 megaPascal (MPa), and heated to a temperature of 328 Kelvin (K). At the predetermined temperature and pressure, the carbon dioxide became supercritical. The tripalmitin formed a melt.

The controller was set to maintain the mixer to rotate the mixer blade at a constant agitation speed of 4000 revolutions per minute (rpm). The melt mixed for 30 minutes.

A solution of 1.4 g of acetaminophen was dissolved in 20 ml of ethanol. The solution pump was activated, and the acetaminophen solution was injected into the mixing chamber while the mixer was mixing. After the solution was injected, the mixer was allowed to continue mixing for 30 minutes.

Additional carbon dioxide from the supercritical fluid pump was circulated through the mixing chamber, and then removed through a backpressure regulator communicating with the mixing chamber. The carbon dioxide dissolved the ethanol and carried the ethanol out of the mixing chamber. The loss of the ethanol from the solution precipitated the acetaminophen out of the solution due to supersaturation. The carbon dioxide was circulated for 30 minutes at a flow rate of 20 ml/min.

Expansion of Particles.

A release valve was opened to communicate the contents of the mixing vessel to an expansion vessel. Specifically, the release valve communicated the emulsion to a nozzle that opened into the interior of the expansion vessel. The nozzle defined an orifice having a diameter of 2.0 mm.

The pressure in the interior of the expansion vessel was standard atmospheric pressure, and the pressure in the mixing vessel was adjusted to remain at a constant 30 megapascals (MPa). The supercritical fluid flashed into a gas at atmospheric pressure. The tripalmitin/acetaminophen material was expanded by the supercritical fluid reacting to the pressure differential and formed particles. The particles were collected in the expansion chamber in the form of dry particles.

Analysis of the Particles.

Analysis of the particles was performed using a Scanning Electron Microscope (SEM) to determine size and morphology and using an X-ray powder diffraction spectrometer (XPD) to determine solid phase/crystallinity.

The particles consisted of porous particle aggregates having a size in a range of from about 50 $\mu m$ to about 100 $\mu m$ as determined by the SEM micrograph. The particles had a characteristic pore size of from about 0.5 $\mu m$ to about 5 $\mu m$. The chemical composition was about 9% w/w of acetaminophen, the balance tripalmitin. The starting compositional ratio was about 18.5% w/w of acetaminophen. The limited solubility of acetaminophen in the $CO_2$/ethanol solvent mixture contributed to the skew in the compositional ratio. The X-ray analysis showed that acetaminophen was present in the form of micron or sub-micron crystalline particles embedded or coated by tripalmitin.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A method of producing particles comprising the steps of:
    contacting a polymer, a wax and/or a lipid that is a solid at standard temperature and pressure with a supercritical fluid in the absence of any solvents to form a melt;
    contacting the melt with a solution comprising a solute dissolved in a solvent that is at least partially soluble in the supercritical fluid to form a mass comprising:
        a melt-rich fraction comprising the melt, a first portion of the supercritical fluid, and the solute, wherein the solute is in the form of solid particles that are dispersed in the melt; and
        a supercritical fluid-rich fraction comprising a second portion of the supercritical fluid and the solvent; and expanding the mass across a pressure drop into a collection vessel maintained above the boiling point of the solvent to evaporate the solvent and flash the supercritical fluid into a gas and thus form composite particles comprising the polymer, wax and/or lipid and the solute.

2. The method according to claim 1 wherein the polymer is a polysaccharide, polyester, polyether, polyanhydride, polyglycolide (PLGA), polylactic acid (PLA), polycaprolactone (PCL), polyethylene glycol (PEG), or polypeptide.

3. The method according to claim 1 wherein the supercritical fluid is selected from the group consisting of carbon dioxide, nitrous oxide, dimethylether, C1-C6 alkane, C1-C6 alkene and alcohols.

4. The method according to claim 1 wherein the solute is a biologically active substance selected from the group consisting of drugs, pharmaceuticals, therapeutic agents, medicinal agents, viral materials, diagnostic aids, nutritional materials, proteins, peptides, antigens, enzymes, catalysts, nucleic acids and combinations thereof.

5. The method according to claim 1 wherein the solvent is selected from the group consisting of alcohol, toluene, ethyl acetate, methyl chloride, methylene chloride, dimethyl sulfoxide (DMSO) and dimethyl formamide (DMF).

6. The method according to claim 1 wherein the solute is present in the solution in an amount in greater than about 1 weight percent.

7. The method according to claim 1 wherein the solute is present in the solution in an amount greater than about 10 weight percent.

8. The method according to claim 1 wherein the solution further comprises a surfactant.

9. The method according to claim 1 wherein the composite particles have an average diameter of from about 0.5 micrometers (μm) to about 15 micrometers (μm).

10. A method of producing particles comprising the steps of:
   contacting a polymer, a wax and/or a lipid that is a solid at standard temperature and pressure with a supercritical fluid in the absence of any solvents to form a melt;
   contacting the melt with a solution comprising a solute dissolved in a solvent that is at least partially soluble in the supercritical fluid to form a mass comprising:
      a melt-rich fraction comprising the melt, a first portion of the supercritical fluid, and the solute, wherein the solute is in the form of solid particles that are dispersed in the melt; and
      a supercritical fluid-rich fraction comprising a second portion of the supercritical fluid and the solvent; and
   extracting the solvent from the supercritical fluid-rich fraction to form a solvent-free residual mass; and
   expanding the solvent-free residual mass across a pressure drop into a collection vessel to flash the supercritical fluid into a gas and thus form solid particles comprising the polymer, wax and/or lipid and the solute.

11. The method according to claim 10 wherein the polymer is a polysaccharide, polyester, polyether, polyanhydride, polyglycolide (PLGA), polylactic acid (PLA), polycaprolactone (PCL), polyethylene glycol (PEG), or polypeptide.

12. The method according to claim 10 wherein the supercritical fluid is selected from the group consisting of carbon dioxide, nitrous oxide, dimethylether, C1-C6 alkane, C1-C6 alkene and alcohols.

13. The method according to claim 10 wherein the solute is a biologically active substance selected from the group consisting of drugs, pharmaceuticals, therapeutic agents, medicinal agents, viral materials, diagnostic aids, nutritional materials, proteins, peptides, antigens, enzymes, catalysts, nucleic acids and combinations thereof.

14. The method according to claim 10 wherein the solvent is selected from the group consisting of alcohol, toluene, ethyl acetate, methyl chloride, methylene chloride, dimethyl sulfoxide (DMSO) and dimethyl formamide (DMF).

15. The method according to claim 10 wherein the solute is present in the solution in an amount in greater than about 1 weight percent.

16. The method according to claim 10 wherein the solute is present in the solution in an amount greater than about 10 weight percent.

17. The method according to claim 10 wherein the solution further comprises a surfactant.

18. The method according to claim 10 wherein the composite particles have an average diameter of from about 0.5 micrometers (μm) to about 15 micrometers (μm).

* * * * *